US012564531B2

(12) United States Patent
Zhang et al.

(10) Patent No.: US 12,564,531 B2
(45) Date of Patent: Mar. 3, 2026

(54) SOFT EXOSKELETON WEARABLE DEVICE FOR TEMPOROMANDIBULAR DISORDER (TMD) REHABILITATION

(71) Applicant: THE UNIVERSITY OF HONG KONG, Hong Kong (HK)

(72) Inventors: Runzhi Zhang, Hong Kong (HK); James Lam, Hong Kong (HK); Zheng Wang, Hong Kong (HK)

(73) Assignee: THE UNIVERSITY OF HONG KONG, Hong Kong (HK)

( * ) Notice: Subject to any disclaimer, the term of this patent is extended or adjusted under 35 U.S.C. 154(b) by 1032 days.

(21) Appl. No.: 17/687,717

(22) Filed: Mar. 7, 2022

(65) Prior Publication Data

US 2022/0296451 A1 Sep. 22, 2022

Related U.S. Application Data

(60) Provisional application No. 63/162,626, filed on Mar. 18, 2021.

(51) Int. Cl.
*A61H 1/02* (2006.01)

(52) U.S. Cl.
CPC ....... *A61H 1/02* (2013.01); *A61H 2201/1409* (2013.01); *A61H 2201/1607* (2013.01); *A61H 2201/165* (2013.01); *A61H 2201/5056* (2013.01); *A61H 2201/5071* (2013.01); *A61H 2205/026* (2013.01)

(58) Field of Classification Search
CPC .... A61H 2201/1409; A61H 2201/5056; A61H 2201/1238; A61H 2205/026; A61H 9/005; A61H 9/0078; A63B 21/065; A63B 21/4003; A63B 23/03; A63B 23/025;
(Continued)

(56) References Cited

U.S. PATENT DOCUMENTS 3,316,899 A * 5/1967 Raeder ..................... A61H 1/02
601/147
6,126,683 A * 10/2000 Momtaheni ............... A61F 5/34
602/17

(Continued)

FOREIGN PATENT DOCUMENTS

BR PI 0604139 4/2008
CN 2257477 7/1997

(Continued)

OTHER PUBLICATIONS

Evans et al (Year: 2016).*

(Continued)

*Primary Examiner* — Brandy S Lee
*Assistant Examiner* — Sara K Toich
(74) *Attorney, Agent, or Firm* — Amin, Turocy & Watson, LLP

(57) ABSTRACT

Disclosed is an exoskeleton wearable device configured to push a condyle out from a glenoid structure of a skull made of two bellows shaped actuators each having an elliptical cross-section; an upper part configured to be fixed on a forehead of a patient and provide a base for the two bellows shaped actuators; and a lower part configured to be fixed on a mandible of the patient and substantially static to the mandible but moveable in a horizontal plane and a vertical plane with respect to the upper part.

16 Claims, 14 Drawing Sheets

(58) Field of Classification Search
CPC .... B25J 9/0006; A61B 5/4542; A61B 17/663; A61C 5/007; A61F 2/3099
See application file for complete search history.

(56) References Cited

U.S. PATENT DOCUMENTS

| | | | | |
|---|---|---|---|---|
| 9,198,820 | B2 | 12/2015 | Philipson | |
| 2008/0173313 | A1* | 7/2008 | Brady | A61B 17/663 128/848 |
| 2012/0186591 | A1* | 7/2012 | Sethi | A61F 5/56 128/859 |
| 2014/0018710 | A1* | 1/2014 | Israel | A61H 1/02 601/5 |
| 2018/0214332 | A1* | 8/2018 | Young | A63B 21/4039 |
| 2019/0143114 | A1* | 5/2019 | Nelson | A61H 39/00 607/3 |

FOREIGN PATENT DOCUMENTS

| | | | | | |
|---|---|---|---|---|---|
| CN | 106239480 | | | 12/2016 | |
| CN | 110946736 | A | * | 4/2020 | A61H 1/02 |
| KR | 101109819 | B1 | * | 2/2012 | A61C 19/05 |
| WO | WO-2012011661 | A2 | * | 1/2012 | A61H 15/0078 |

OTHER PUBLICATIONS

Demuynck et al (Year: 2021).*
Takanobu et al (Year: 2002).*
Xu et al (Year: 2007).*
Wang et al (Year: 2010).*
Takanobu et al (Year: 1998).*
Surya et al (Year: 2017).*
Chinese Search Report for Chinese Patent Application No. 202210260970X dated Sep. 24, 2024.
Chinese Search Report for Chinese Patent Application No. 202210260970X dated Feb. 17, 2025.
Runyes Focus on Dental Product Display, http://en.runyes.com/products/3.html.
5 Silicone Dental Mouth Guard Bruxism Guard Night Teeth Tooth Grinding Sleep Aid, https://www.ebay.com.au/itm/396284409662?_trkparms=amclksrc%3DITM%26aid%3D1110006%26algo%3DHOMESPLICE.SIM%26a0%3D1%26asc%3D20220405142716%26meid%3D2a53fca524d642458c4bcbc56c783d6d%26pid%3D101506%26rk%3D9%26rkt%3D10%26sd%3D286723667172%26itm%3D396284409662%26pmt%3D1%26noa%3D1%26pg%3D4481478%26algv%3DDefaultOrganicWebWithV11WebTrimmedV3VisualRankerWithKnnV3AndUltBRecallAndCassiniEmbRecall.
Periapical radiography, https://www.slideshare.net/slideshow/d101-w4/60506542.

* cited by examiner

Table 1: Structure and Material Parameters of the Soft Robotic Joint

| Structure Parameters | |
|---|---|
| Outer diameter/Inner diameter ratio | $a = D/d = 1.2$ |
| Original Length (mm) | $l_0 = 40$ |
| Wall thickness (mm) | $t = 1$ |
| Number of Convolutions | $N = 10$ |
| Predesigned End Effector Angle (degrees) | $\gamma = 30$ |
| **Material Parameters** | |
| Young`s Modulus (MPa) | $E = 8$ |
| Poisson`s Ratio | $\mu = 0.32$ |

Fig. 7B

SOFT EXOSKELETON WEARABLE DEVICE FOR TEMPOROMANDIBULAR DISORDER (TMD) REHABILITATION

CROSS-REFERENCE TO RELATED APPLICATIONS

This application claims priority to U.S. Provisional Application Ser. No. 63/162,626 filed on Mar. 18, 2021, the entire contents of which are incorporated herein by reference.

TECHNICAL FIELD

Disclosed are wearable devices for temporomandibular disorders and methods related thereto.

BACKGROUND

Temporomandibular disorder (TMD) is a disease that affects an individual to move the jaw, including the temporomandibular joint (TMJ) and the muscles. TMD symptoms include restricted movements and noises when patients move the jaw and great pain. The patients will suffer from difficulties of speaking and chewing foods having TMD. Such disease can be caused by TMJ misalignment or by masticatory muscles. It has been reported that nearly 10 million peoples are suffering from TMD in the world and no proper therapy were invented. Irreversible treatments by surgery implants has proven to be not effective and would increase the chance to cause severer pain and permanent damage to the jaw.

What leads to the difficulties to treat TMD is the complex motion of the TMJ, which comprises rotation about a kinematic axis that also moves translationally. When the jaw opens smally, the TMJ rotates nearly purely, while more wide opening of the jaw will cause translational motion of the TMJ. Such combination of the rotating and sliding motion is quite difficult for mechanical structure to replicate, particular with the unique jaw dimensions of different individuals.

With reference to the critical demand of treating TMD, medical workers as well as researchers have proposed and manufactured various kinds of device for training. Since the patients will suffer from difficulties of moving the jaw, which is opening or closing the mouth, the current training device most aims to assist them by applying an external force to unclench the restricted mouth. The early manual exercise is usually conducted by a lever-based tool with only vertical-plane motion. Recently, more complicated treatment devices appeared and are studied for mimicking the humans' jaw motion. The simply unclenching treatment with rigid linkages does not comply with true jaw moving trajectory, thus will cause further pain and damage. A parallel mechanism of six degrees of freedom able to reproduce the same movable range and force as the human's jaw has developed by mimicking the doctors' hand motion during a mouth opening session. A four-bar linkage helmet-based wearable device is proposed for the purpose of practical training of TMD, utilizing motors and driving belt to replicate the motion of the human's jaw. To keep the mandible or teeth in same proper orientation over the chewing trajectory, two more links were added to form a six-bar linkage mechanism, being proposed with planned occlusal angle and velocity. The concept design of a shoulder-mounted robotic exoskeleton for the neurological training of TMD is presented with a shifted motor-driven joint and an in-mouth sheet which is used for transferring the force to the lower teeth to drive the mouth open. However, the methods themselves go with incredibly large system, which are not designed considering the patients' utmost interests and comfort, prone to the following limitations: 1) the whole device is huge, bulky and not feasible for patients to wear restricting the convenience to train and rehabilitate; 2) the rigid mechanism with insufficient compliance whose pre-planned motion is not suitable for every unique individual, which would cause unsafety and further damage.

In most existing TMD training devices, the more satisfactory methods are with as much as possible lightness, safety and comfort and can accommodate the needs of the patient. The exoskeleton robots, among them, provide more convenient using situations for training, but still the conventional motor-driven and linkage-based mechanism design has highly limited compliance and adjustability in jaw motion output, therefore restricts its application to TMD training requiring safety and easy customization.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

As described herein, a novel exoskeleton wearable device at least one of: 1) achieves real human's jaw motion with soft robotic approach, reducing the whole wearable robot's weight and increasing the safety and comfort; 2) guides the jaw movement in vertical-plane sliding movement while reserving the compliance in horizontal plane; 3) considers specific TMJ features for potential TMD treatments. The proposed exoskeleton soft wearable device is shown in FIGS. 1A and 1B. The proposed mechanisms can achieve prodigious features with proper design, that are extensively utilized in compliant soft actuator-based robotic hands and biomimetic works. In this work, systematic analysis and investigation of the 2-actuator soft joint are conducted and validated both on table and on a skull by vision tracking. Experimental results of showing the moving performance of the proposed exoskeleton soft wearable device are presented and discussed in detail to validate the investigations.

Disclosed herein are exoskeleton wearable devices configured to push a condyle out from a glenoid structure of a skull made of two bellows shaped actuators each having an elliptical cross-section; an upper part configured to be fixed on a forehead of a patient and provide a base for the two bellows shaped actuators; and a lower part configured to be fixed on a mandible of the patient and substantially static to the mandible but moveable in a horizontal plane and a vertical plane with respect to the upper part.

Also disclosed are methods of treating a temporomandibular disorder involving attaching the exoskeleton wearable device to the skull of a patient; and using the exoskeleton wearable device to facilitate at least one of opening or closing a jaw of the patient.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF SUMMARY OF THE DRAWINGS

FIG. 7B depicts Table 1 which reports the structure and material parameters of a soft robotic joint in accordance with one embodiment.

FIG. 8*a* shows the actual trajectory agrees well with the calculated one with deviation of less than 1 mm. Grey circle shows the angle variation during the actuating. FIG. 8*b* shows the kinematic characteristics, including velocity, acceleration, angular velocity and angular acceleration are shown. The sharp slope of the variation shows quick response of the motion once being actuated.

FIG. 9*a* shows trajectory comparison and angle variation. FIG. 9*b* shows kinematic characteristics.

FIG. 10*a* shows trajectory comparison and angle variation. The angle barely changed during the actuation. FIG. 10*b* shows kinematic characteristics. Angular velocity and angular acceleration oscillated within very small range by calculation since the angel changing value is nearly zero.

FIG. 11*a* shows the pressures solved inversely by displacement function. The actual pressures follow well with the calculated ones with the pneumatic control platform. FIG. 11*b* shows trajectory comparison and the angle variation. The actual trajectory's trend agrees well with that of the planned one. FIG. 11*c* shows kinematic characteristics.

FIG. 12*a* shows trajectory comparison and the angle variation. Green circle zoomed right side on-skull captured trajectory. Triangles show the captured trajectory of that the device were not actuated, while the dots show the one of being actuated. Grey triangles and dots respectively represent the same trend in the initial period of actuating. Difference is shown by the blue triangles and the red dots that when actuating the device, the end effector could significantly push the condyle out of the glenoid structure. The angle variation curve shows the movement is first rotating then sliding. FIG. 12*b* shows kinematic characteristics.

DETAILED DESCRIPTION

The disclosure herein enables the rehabilitation utilizing a soft approach, which is not found in the art. The soft mechanism described herein has at least one of several advantages:

1. Considering the real human TMJ mechanism;
2. Lightweight, comfort and safety;
3. Natural compliance, not causing further injury;
4. Trajectory planning and customization.

Current training devices for TMD are bulky and large not made considering the patients' comfort and safety, which aims to forcibly drive the mandible to move. The disclosure herein provides a lightweight and customizable device adopting soft approach to help the patients train correct jaw moving at home by using soft actuators driven by pneumatic control, which is lightweight and compliant to individual differences. Herein is described a wearable exoskeleton device with trajectory planning by pneumatic control. The preliminary pneumatic control for activating the device to replicate human' jaw motion is achieved. To optimize the performance and the customization, precise control with various payload can be developed.

Temporomandibular disorder (TMD) cases require correct and sufficient guide to the patients' mandible movement. It is the most ideal application where robotic device is demanded for the movement training apart from the surgical operations done by the doctors. Provided is a two-soft-actuator robotic joint design applied on an exoskeleton soft wearable device with substantial improvements over the existing training device. The soft device helps reduce tremendous weight of the device and reserves the system compliance considering patients' comfort and safety, which brings highly capacity of wearing and self-training. The pneumatic-control-based trajectory planning enables customization of the device for the purpose of satisfying accommodating patients' individual difference. The design, modeling, fabrication, and validation of an exoskeleton soft wearable device for TMD are presented in detail below. Both on-table unit and the on-skull testing are enabled, showing the remarkable ability of guiding the mandible to move according to the real human nature, paving the way for further clinical applications of such disease.

The Mandible Moving Mechanism

Figure 2:
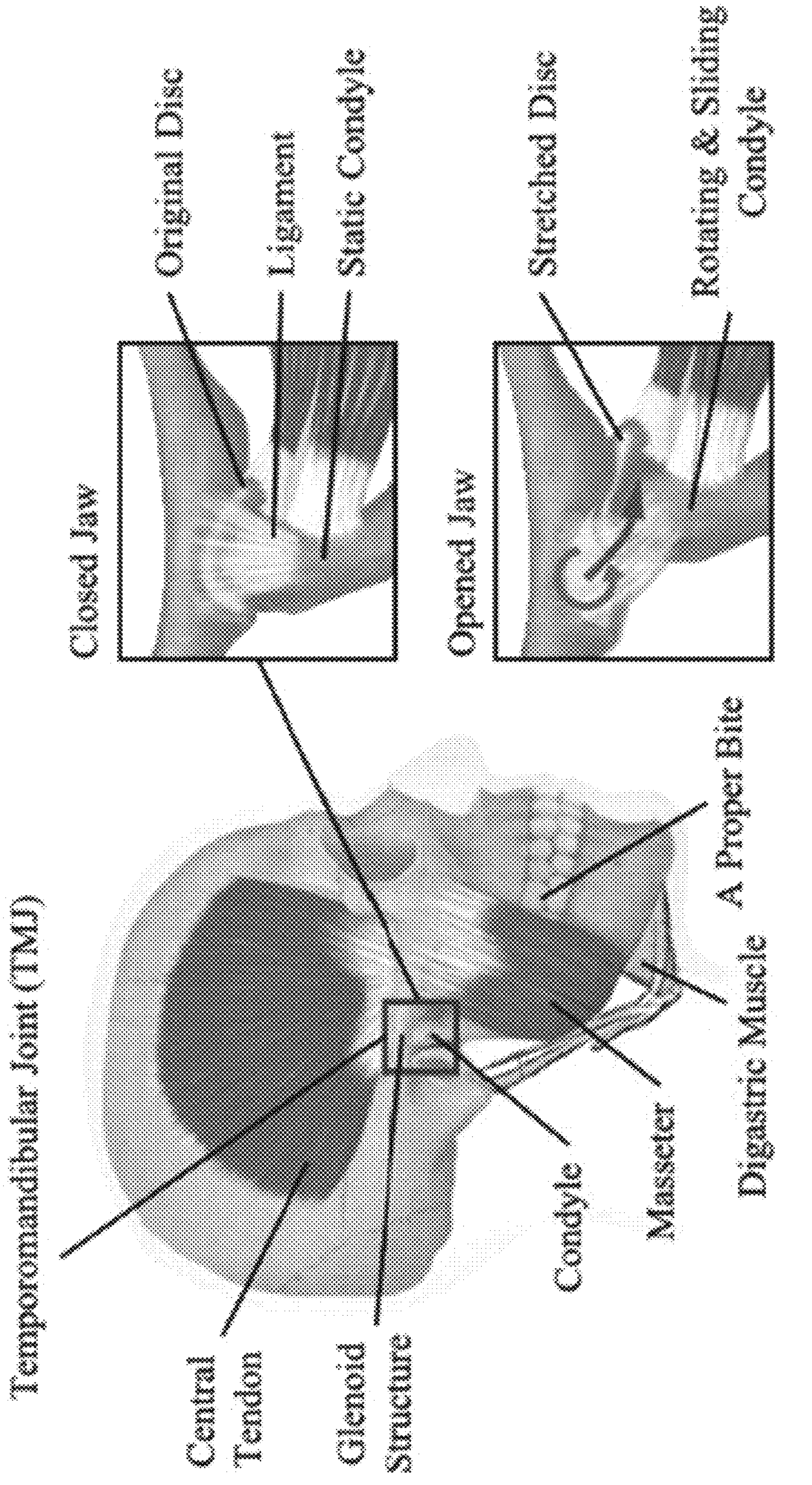
FIG. 2. depicts an anatomical structure of the human's masticatory system. Upper right shows the closed jaw where the condyle fits in the glenoid structure. Lower right shows the opened jaw where the condyle slides out of the glenoid structure.

Human's masticatory system has a well-developed structure being able to perform functions of chewing, stirring and swallowing food. The mandible is mobile achieving various motions by accommodating the attachments of muscles and ligaments, shown in FIG. 2. In theory, due to the rigidity of the mandible, the position can be completely reconstructed using a single point's orientation and position. If the maxilla and hypoid are fixed, the motion of the mandible can be derived knowing the condyle's situation of the TMJ.

The TMJ is a diarthrodial joint, which can move between bones, consisting of a series of bony and soft tissue components. The bony parts include the condyle of the mandible and the glenoid structure on the skull. Such combination can efficiently act as a pivot for the multi-dimensional movements, as a fulcrum for leverage, and as the guides for mandible movements. While the soft tissues include mainly the articular disc, which is a continuous structure between the bony and articular surfaces of the TMJ.

This disc is to prevent the bony parts from colliding each other and its moving is also to ensure smooth movement of the condyle. The displacement of the articular disc can also cause the TMD, leading to click sound, synovitis, pain and limitation of motion. With the protection of the disc, the condyle can rotate about a horizontal axis as well as slide along the articular eminence. With the complex structure and the moving mechanism of the TMJ, what is ignored by the current therapy robots is the real motion trajectory of the condyle. To mechanically and forcedly opening patients' mouth causes further damage to the condyle, articular disc or to the whole TMJ.

The TMJ Soft Robotic Joint Design

In order to ensure the jaw movement training correct and does not cause further damage, a 2-soft-actuator joint design provides an exoskeleton support actuated as the real TMJ motion trajectory. With the two combined pneumatic actuators, the proposed soft approach is able to replicate the condyle moving trajectory of different unique individuals by pressure control, with much lighter weight and higher compliance for patients' comfort and safety, compared with the existing therapy devices.

Figure 3:
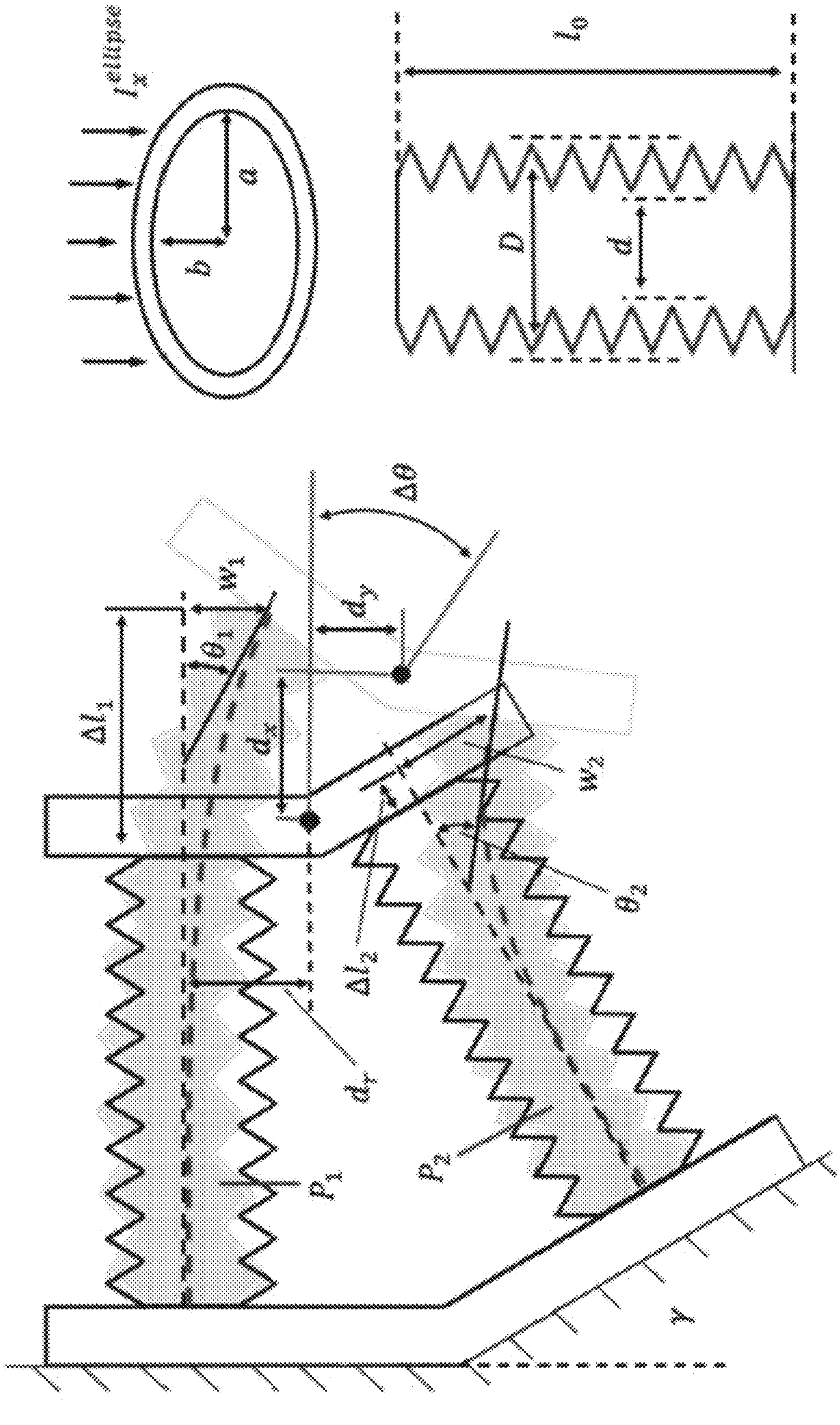
FIG. 3 depicts the TMJ soft robotic joint and the analytical modeling key parameters.

The soft actuators are chosen as well-studied bellows shape ones and are assembled with an angle for having an inherent multiple degree of freedom compared with conventional parallel structure. In addition, since the deformations are within the lateral plane, an ellipse cross-section actuator is chosen for more efficient bending than circle cross-section one. An analytical model is derived for studying the deformation of the proposed joint and the geometrical relationship is denoted in FIG. 3.

For a bellows shape soft actuator with number of convolutions N, outer diameter/inner diameter ratio α, cross-sectional area S, Young's modulus E, wall thickness t, Poisson's ratio μ, and original length l0, the lengths after being inflated are:

$$l_1 = l_0 + \frac{P_1 \cdot S}{k_y} = l_0 + \frac{P_1 \cdot S \cdot 3N(1-\mu^2)4r^2\left[\ln\alpha - (\alpha - 1) + \frac{(\alpha-1)^2}{2}\right]}{\pi E t^3} \tag{1}$$

where l1 is the elongated length of the actuator 1, ky is the axial stiffness, and P1 is the inner pressures of the actuator 1.

The torques making the actuators bending are:

$$M_1 = M_1 + M_P = M_1 + \int_0^{l_1}\int_0^{2\pi} P_1 \cdot r^2 \sin^2\theta d\theta dx \tag{2}$$

where M1 is the torque caused by the end effector, MP is the torque caused by the inner pressure of the actuator, and r is the simplified circle inner radius of the ellipse actuator.

Then the deflection function w1 of the actuator 1 can be written according to the cantilever beam theory:

$$\frac{d^2 w_1}{dx_1^2} = \frac{M_I}{EI_x^{ellipse}} = \frac{M_I}{E\frac{\pi}{4}a^3 t\left(1 + \frac{3}{\beta}\right)} = \frac{-f_1(l_1 - x_1) + \int_0^{l_1}\int_0^{2\pi} P_1 \cdot r^2 \sin^2\theta d\theta dx_1}{E\frac{\pi}{4}a^3 t\left(1 + \frac{3}{\beta}\right)} \tag{3}$$

where x1 is the position on the actuator in x-axis, $Ix^{ellipse}$ is the momentum of inertia of the ellipse tube in x-plane, and β=b/a is the parameter of the ellipse with half major axis a and half minor axis b.

The force caused by the end effector on the actuator 1 and 2 are denoted by f1 and f2 should have the relationship, $$P_1 \cdot S = f_1 \cdot \cos\gamma + f_2 \tag{4}$$

also due to the connection with the end effector, the two actuators should have the geometrical relationship of:

$$\begin{aligned} &2 \times \left(x_1|_{x_1=l_0} - x_2|_{x_2=l_0}\right) \times \left(\Delta l_2 - \left(w_2|_{x_2=l_2}\right)\cdot\sin\gamma + \Delta l_2 \cdot \cos\gamma\right) + \\ &\left(y_1|_{x_1=l_0} - y_2|_{x_2=l_0}\right) \times \left(w_1|_{x_1=l_1} - \left(\left(w_2|_{x_2=l_2}\right)\cdot\cos\gamma - \Delta l_2 \cdot \sin\gamma\right)\right) = \\ &-\left(\Delta l_1 - \left(w_2|_{x_2=l_2}\right)\cdot\sin\gamma + \Delta l_2 \cdot \cos\gamma\right)^2 - \\ &\left(w_1|_{x_1=l_1} - \left(\left(w_2|_{x_2=l_2}\right)\cdot\cos\gamma - \Delta l_2 \cdot \sin\gamma\right)^2\right. \end{aligned} \tag{5}$$

where γ is the pre-designed angle of the end effector.

Applying the boundary conditions at the built-in end as well as the above geometrical relationships:

$$w_1'|_{x_1=0}=0; w_1|_{x_1=0}=0 \tag{6}$$

$$w_2'|_{x_2=0}=0; w_2|_{x_2=0}=0 \tag{6}$$

$$\Delta\theta = w_1'|_{x_1=l_0} = w_2'|_{x_2=l_0} \tag{8}$$

where μθ is the rotation angle of the end effector, all the constraints of integration can be solved.

Thus, the relationship of the end effector's displacements and the inner pressure of the actuators could be derived (dx,dy)=f(P1,P2). Solving this equation given the desired displacements of x- and y-axis, the pressure commands can be obtained for trajectory planning.

The Exoskeleton Wearable Device Design

Figure 1A:
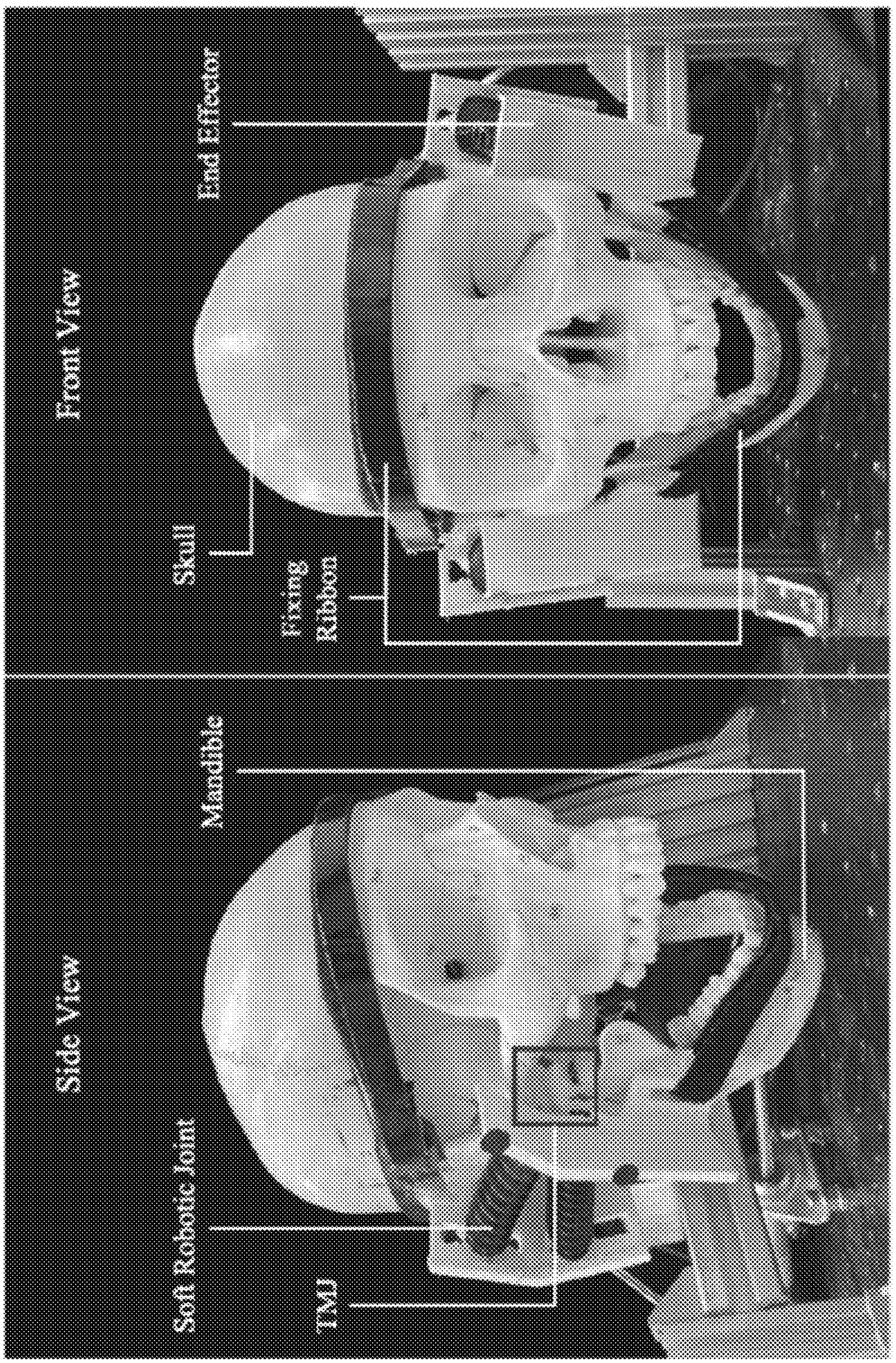
FIG. 1A depicts the exoskeleton soft device wearing on a skull model in accordance with one embodiment, a side view (left) and a front view (right).
Figure 1B:
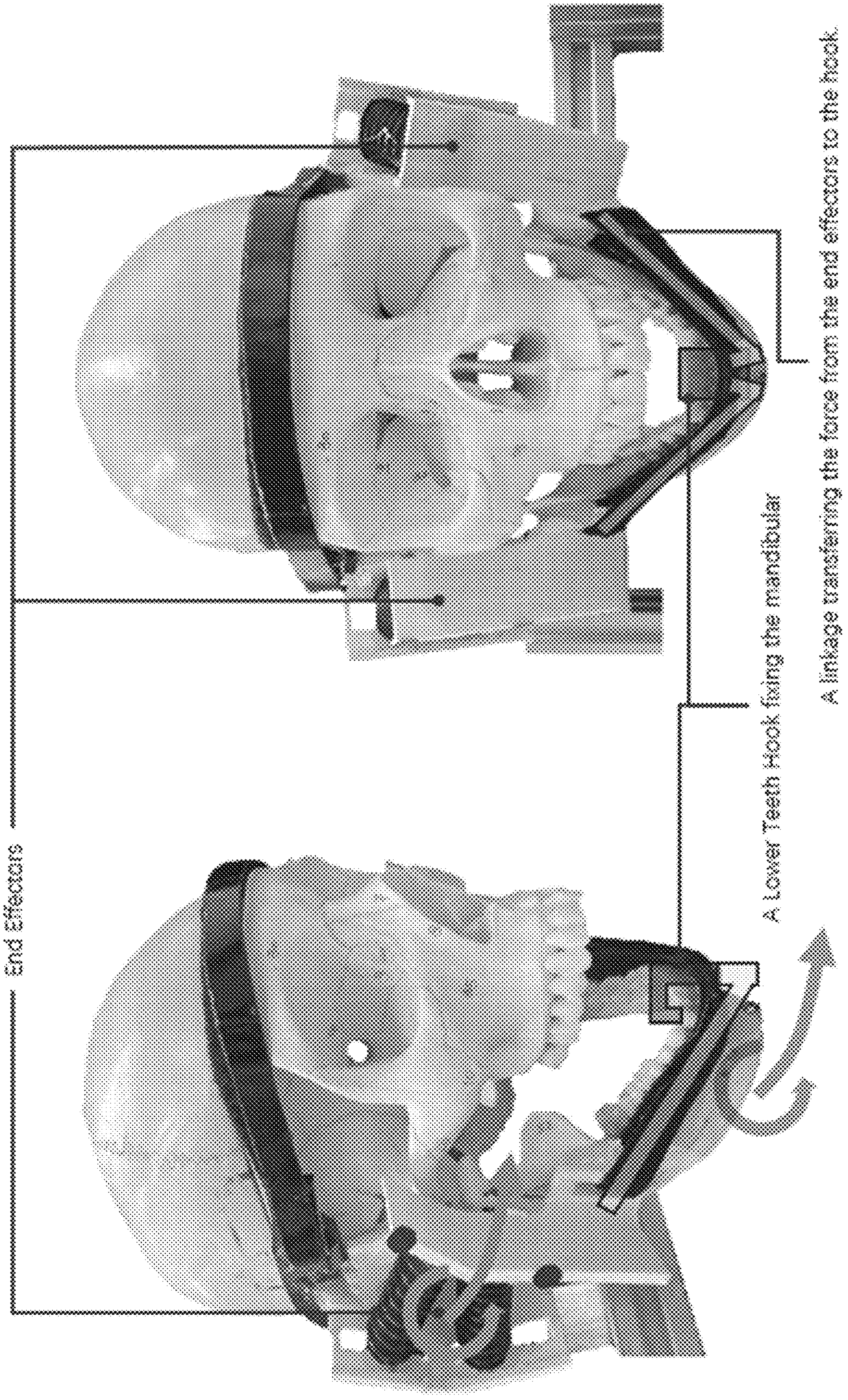
FIG. 1B provides a duplicate of the illustration of the exoskeleton soft device wearing on a skull model of FIG. 1A and provides additional labeling.

Connected by the proposed two-soft-actuator robotic joint, the exoskeleton wearable device comprises two main parts which are both lightweight and wearable, shown in FIGS. 1A and 1B. The upper part is to be fixed on the patients' head and is designed as a thin ring. The ring which is soft and adjustable works as the base for the robotic joint. Thus, the upper part is relatively static with the glenoid structure on the skull and provide fiducial points during the movement. Then, the lower part is fixed on the mandible and relatively static to it. To apply force on the mandible when actuating, a ribbon connecting the left and right parts is tightened on the patients' chin. With the two wearable parts connected by the soft robotic joint, patients have a supportive force and motion when doing the mouth opening training assisted by the pneumatical control. Also, for the purpose of comfort safety and adjustability, the exoskeleton device is fabricated with an elastic material and rubber-like gaskets are attached to the contacting place of the patients' skin.

The whole device inherently reserves the compliance within all the moving freedoms, including both horizontal and vertical planes. Such compliance ensures the safety by allowing the tolerance to the individual uniqueness, because the real moving trajectory of the humans' mandible is not a simple to-and-fro curve only in one plane. The conventional training device sacrifices such compliance, ignoring the individual difference and the complexity of the motion, which can cause further damage to the patients during training. The herein described device utilizes the soft approach to allow and fit the individual difference, simultaneously provides sufficient support to help push the condyle out from the glenoid structure of the skull.

Control Scheme

Figure 4:
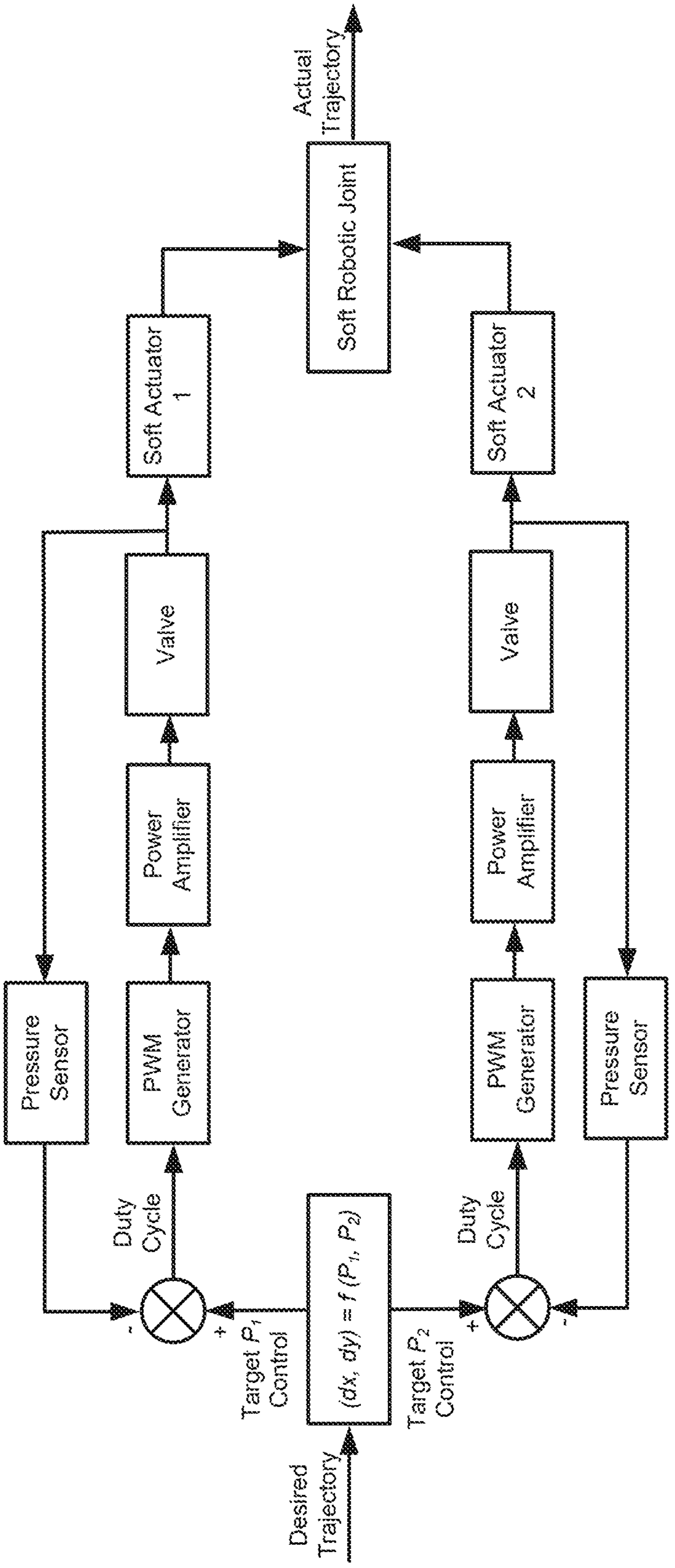
FIG. 4 depicts an embodiment of a control scheme of the soft robotic joint.

For the exploration of the impact of the proposed exoskeleton soft wearable device on TMD training, the system is controllable and able to accurately generate pressure command output according to the desired motion trajectory. For the proposed soft actuators, pressures controlled by the solenoid valves whose duty cycle and frequency are particularly able to be adjusted by pulse width modulation (PWM) signal. The overall controller diagram for the wearable device is shown in FIG. 4. The desired motion trajectory is considered by the planner to generate target pressures, which are further evaluated by dedicated frequency and duty cycle controllers of the valves. The generated commands are then passed on to the PWM generator block to generate corresponding PWM signals. Both PWM signals are amplified by the two power amplifiers and sent to valves. Pressure feedback loop is established to monitor the actual pressures for achieving more accurate trajectory.

To investigate the influences of the proposed exoskeleton soft wearable device on the mandible moving, a prototype of the robot was developed and tested both on a single robotic joint and on a skull model. Results and discussions are presented in detail.

The Soft Robotic Joint

Figure 6:
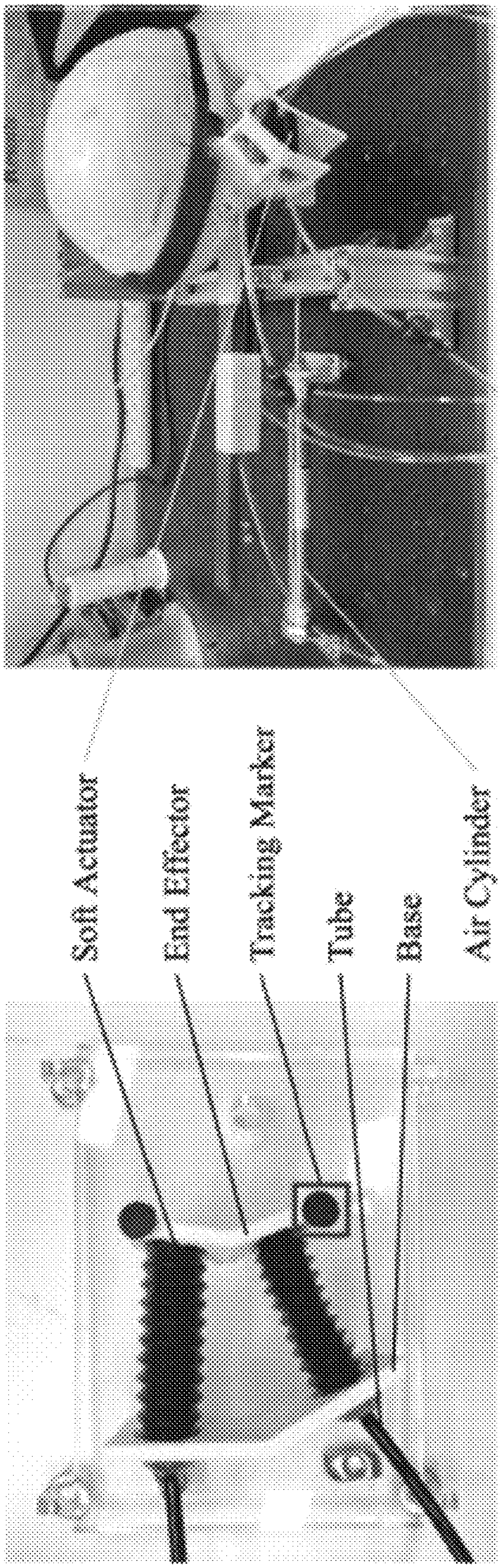
FIG. 6 depicts an embodiment of the experimental platform. Left shows the on-table soft robotic joint unit testing platform with two markers for capturing the actual trajectory and the kinematic characteristics of the motion. Right shows the on-skull testing platform with an air cylinder driving the major motion of the jaw opening.

The proposed soft robotic joint consisted three parts: a base, an end effector and two bellows-shape ellipse soft actuators, shown in FIG. 6. The base and the end effector are both fabricated by a consumer-grade 3-D printer with PLA material. The soft actuators are fabricated by the means of blow molding and chosen as the parameters shown in Table 1.

The Pneumatic Control System

Figure 5:
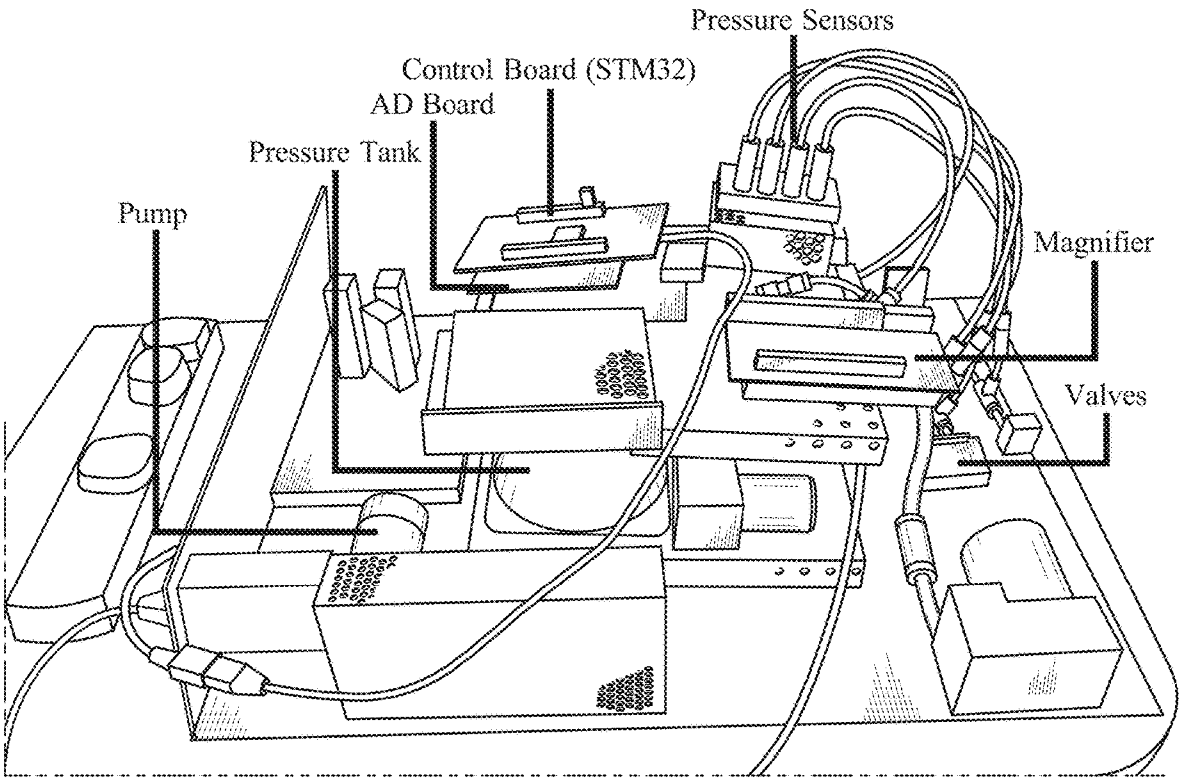
FIG. 5 depicts an embodiment of a pneumatic control platform.

The dedicated experimental platform consists of a pneumatic control system, shown in FIG. 5. The pneumatic pressure source and sink system contain two pumps and two pressure tanks, and the inflation and the deflation of the soft actuators are each controlled by two high-frequency solenoid valves connecting to the source and the sink respectively. The whole system is controlled by a STMicroelectronics microcontroller unit (STM) board and analog-to-digital unit (AD) and driver board are used for sensors and valves. Pressure sensors are connected to the source and sink tank for maintaining the high and low level of the pressure. In addition, each soft actuator is monitored by a pressure sensor for feedback control of the pressure. Thus, the pneumatic control system could generate a stable and reliable output of the pressure to the actuation sector of the proposed device.

The On-Skull Experimental Platform

In addition to the TMJ structure, the normal jaw opening is actuated by a series of human muscles, including suprahyoid muscles, lateral pterygoid muscles, masseters, digastric muscles, etc. In this testing case, the dysfunction of the muscle group is not considered, which means it is assumed that the patients have the muscle strength to move the jaw, but the joint gets stuck causing pain, or the muscles are not exerted in the correct way. The wearable device helps the patients to gain the correct moving of the jaw. Therefore, the target of the work as an assistance focusing on the TMJ instead of forced opening. Thus, the complex muscle group for moving the jaw is achieved by a simple pneumatic cylinder, shown in FIG. 6. The cylinder with a flexible connection with the chin replicates the slightly curved moving trajectory of the lower dentition. The proposed soft joint and the cylinder simultaneously actuates the mandible to perform normal opening and closing of the mouth mimicking the real biological process.

Overall, in one embodiment, the fabricated wearable parts of the exoskeleton soft wearable device weighs 340 grams or less connected with the pneumatic control platform by two air tubes.

Lateral Compliance Tests

Figure 7A:
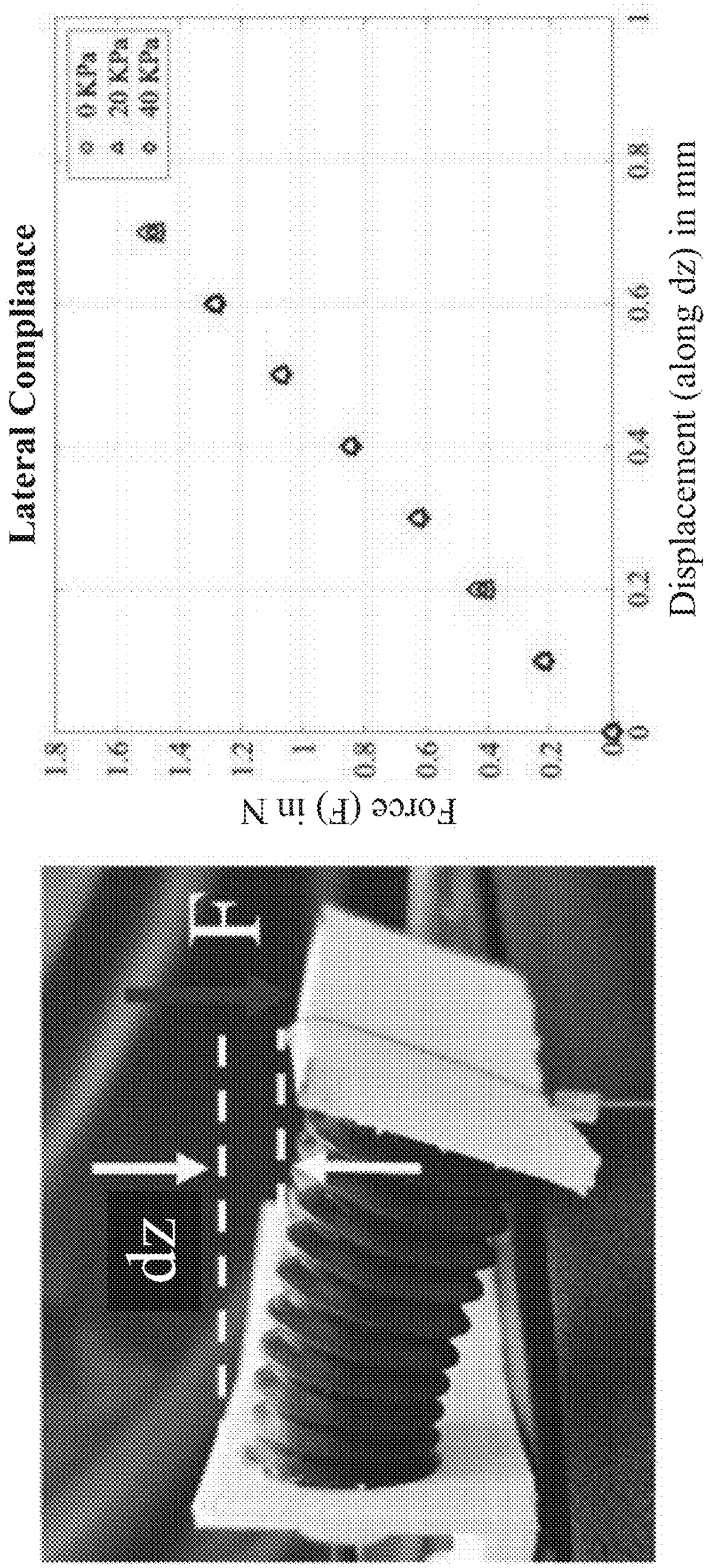
FIG. 7A depicts lateral compliance testing. Forces were applied on the illustrated direction to test the displacements. No obvious difference of compliance when being actuated.

To validate the compliance reserving ability of the soft robotic joint, a group of tests were conducted on the table unit. Forces were applied on the direction shown in FIG. 7 and the vertical displacements were recorded. Being actuated under three group of pressures were tested, including 0 KPa, 20 KPa and 40 KPa. From the results, to achieve same displacements, no difference of load applied were needed, implying that during the actuation period, the compliance in the vertical plane could maintain significantly.

Soft Robotic Joint Tests

Figure 8:
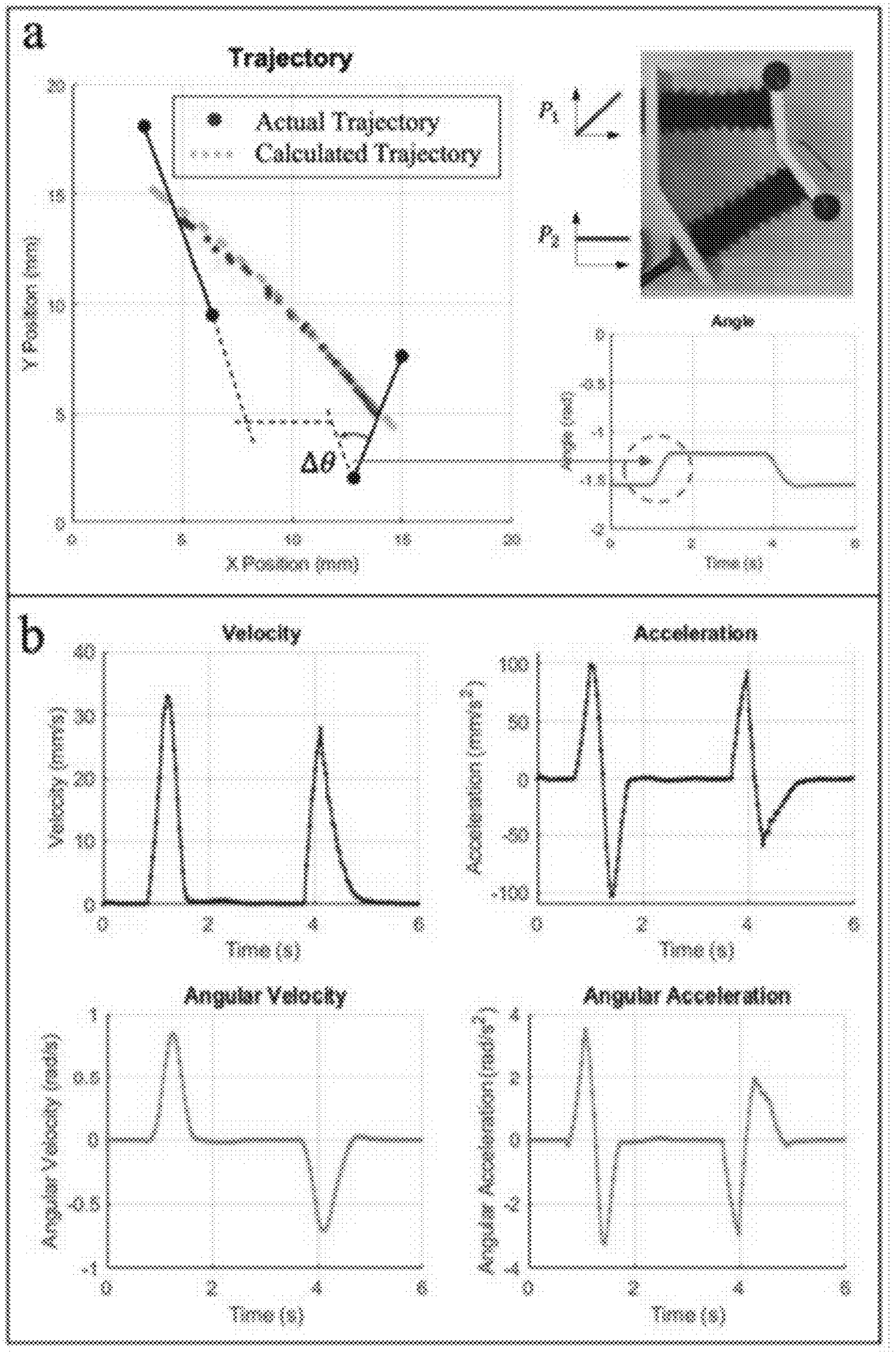
FIG. 8 depicts testing results of only actuating the upper actuator. The actual trajectory is compared with the calculated trajectory.
Figure 9:
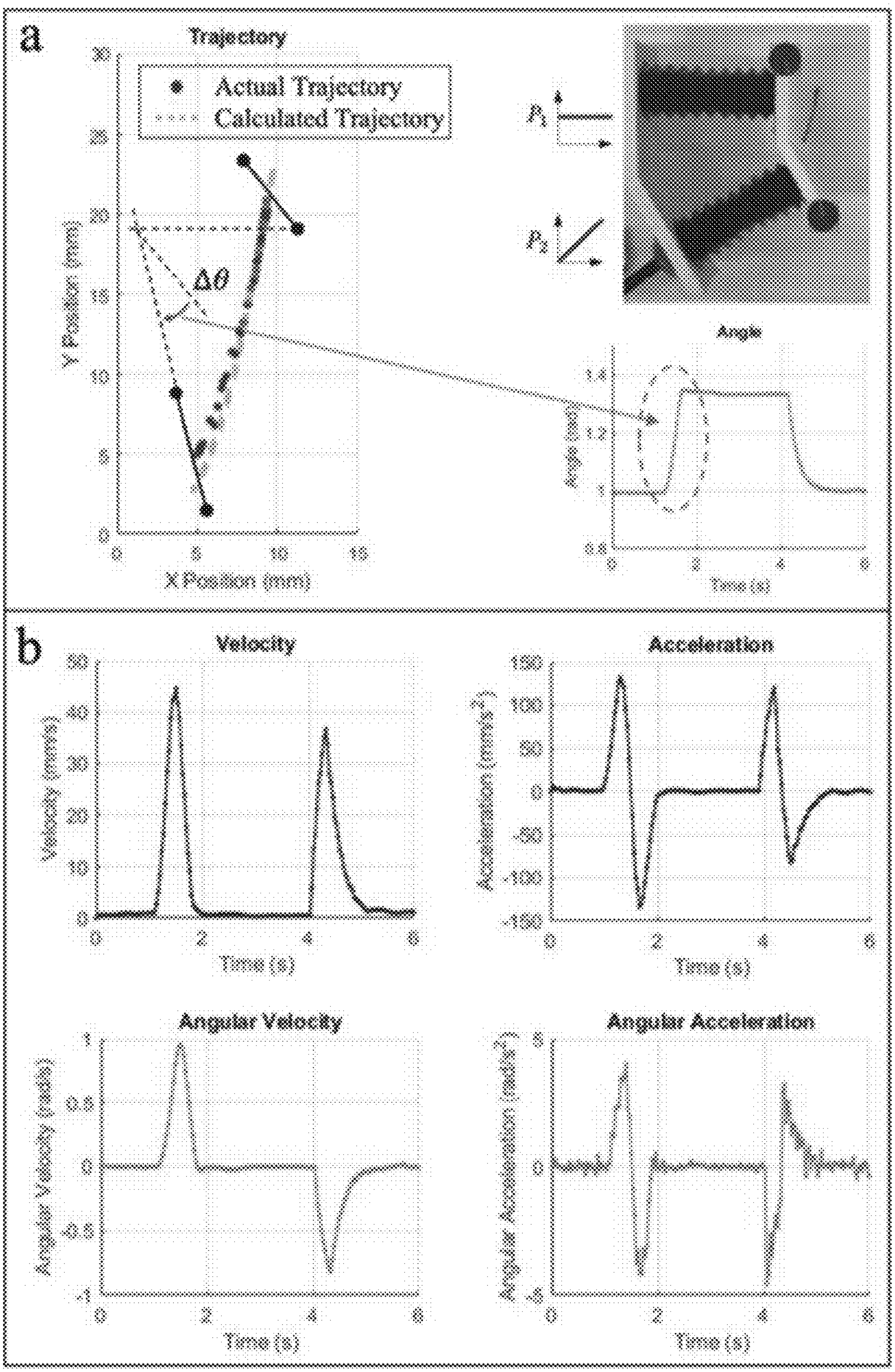
FIG. 9 depicts testing results of only actuating the lower actuator.
Figure 10:
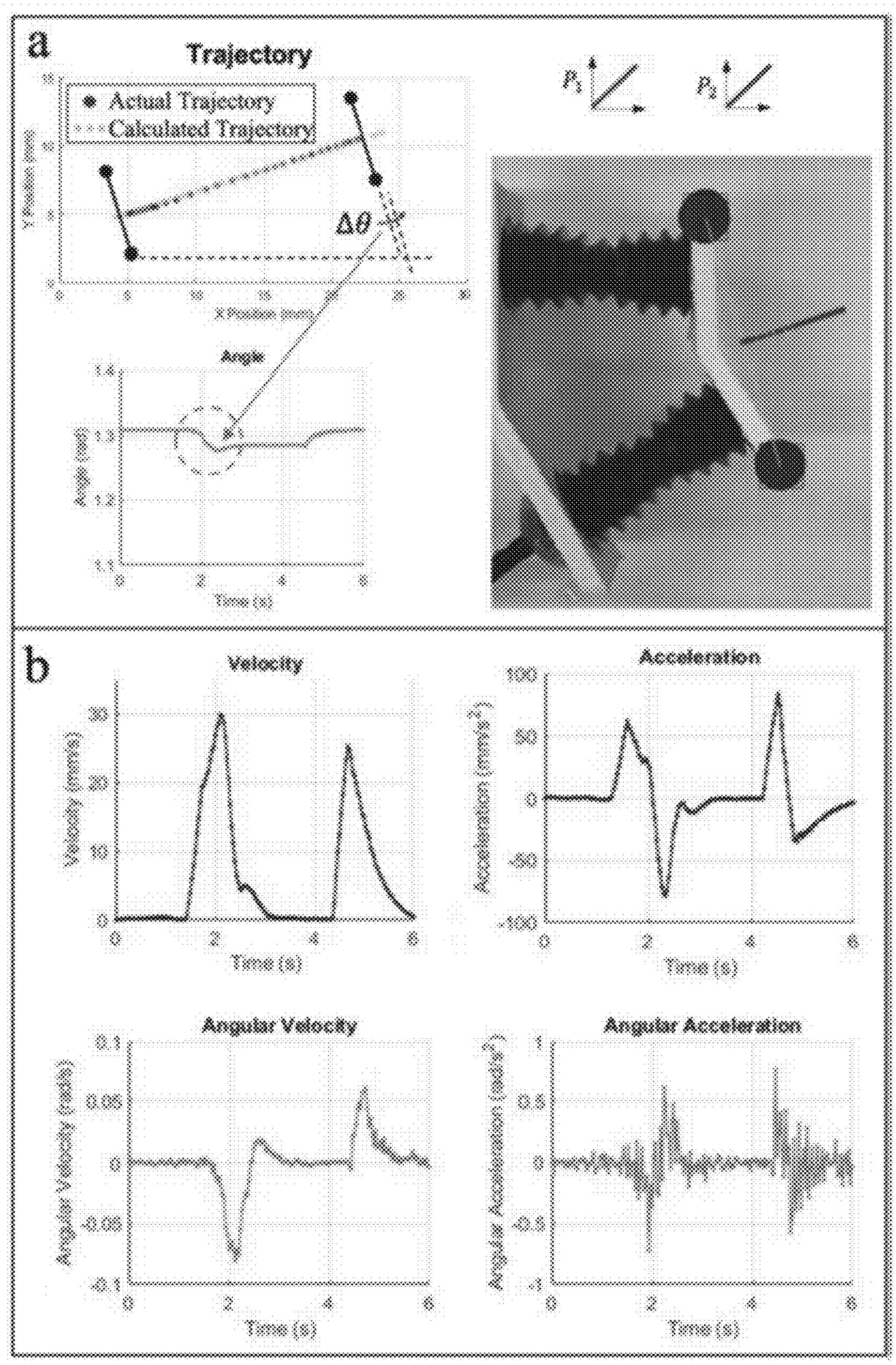
FIG. 10 depicts testing results of actuating both two actuators.

To validate the trajectory mimicking capability of the proposed soft robotic joint, an on-table testing unit with two ellipse soft actuators was tested actuated by different commands of pneumatic pressure control. Three groups of repeat experiments were conducted, including actuating only the upper actuator, actuating only the lower actuator and actuating both the two actuators, with linear pressure variation. The motion of the two markers was tracked by a camera and computer vision techniques were utilized to fetch the actual trajectory. The testing results are shown in FIG. 8, FIG. 9, and FIG. 10, suggesting excellent fitting with the calculated trajectory with the maximum deviation of no more than 1 mm. The analytical model gives satisfactory simulation of the displacements in the plane. Thus, to inversely solve the displacement function with respect to the pressures then generate the pressure command by the desired trajectory. Applying such command by the pneumatic control platform, the motion are mimicked subject to the desired trajectory.

In addition, the kinetic characteristics were calculated with the computer vision. The velocity, acceleration, angular velocity and angular acceleration were presented. The response of the actuation is quick, and the motion performance could be monitored and cooperated with the control system, the device has the potential to let patients individually adjust the training process.

Figure 11:
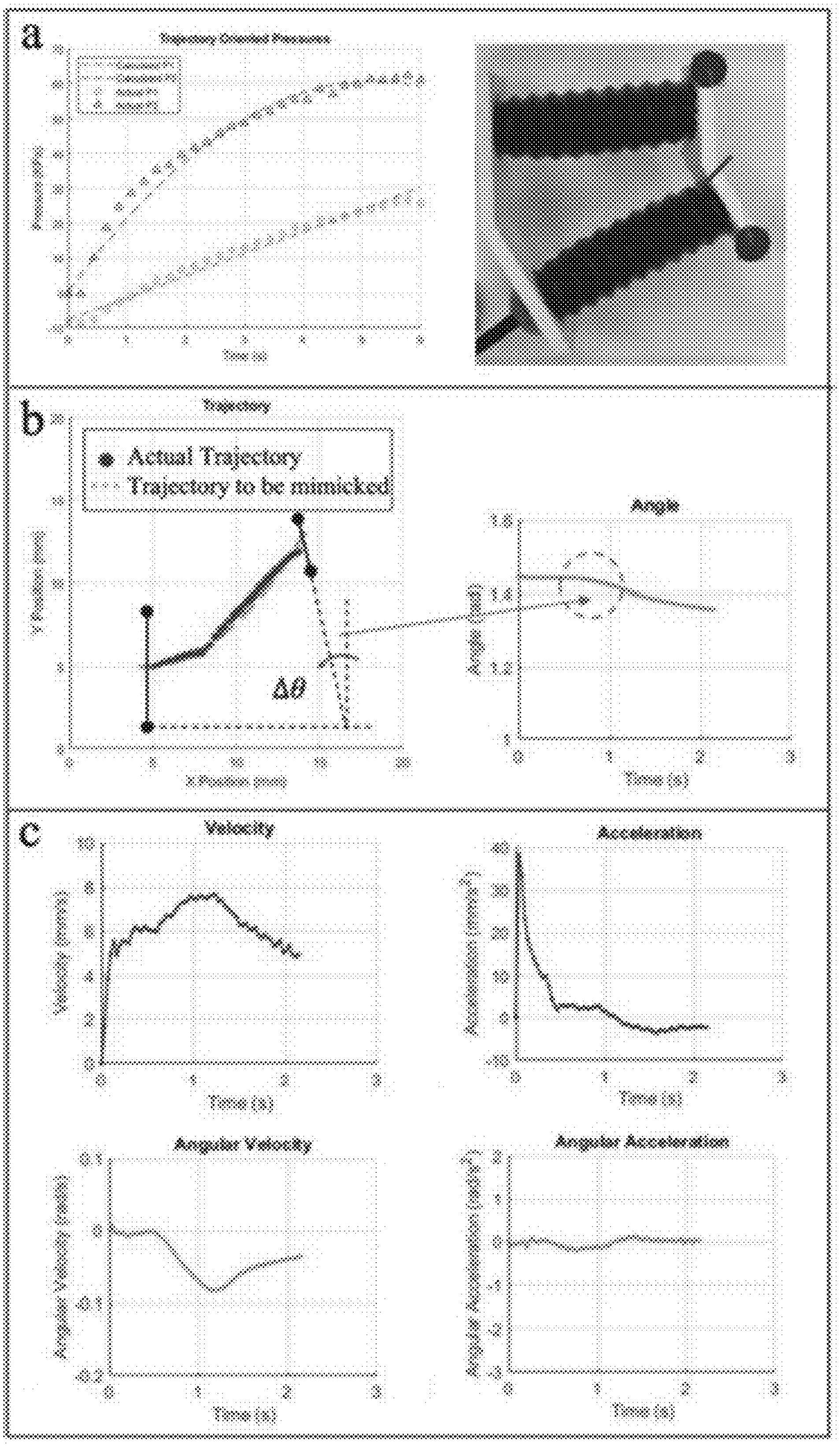
FIG. 11. Testing results of trajectory mimicking.

Applying the validated soft robotic joint, the desired trajectory mimicking was tested. A moving trajectory of the end effector was planned according to the real humans' condyle motion. With the planned trajectory, pressure commands were inversely solved by the relation function. Then the actual trajectory was captured and compared with the planned one, shown in FIG. 11. The actual pressures monitored follows well with the pressure command under the control of the pneumatic platform, and the trend of the motion well agreed with the planned trajectory, however, due to the control accuracy of the adopted valve, the motion of the end effector was a little oscillated.

With the validation of the soft robotic joint, the motion performed by the proposed wearable device can be adopted on a real situation.

On-Skull Tests

Figure 12:
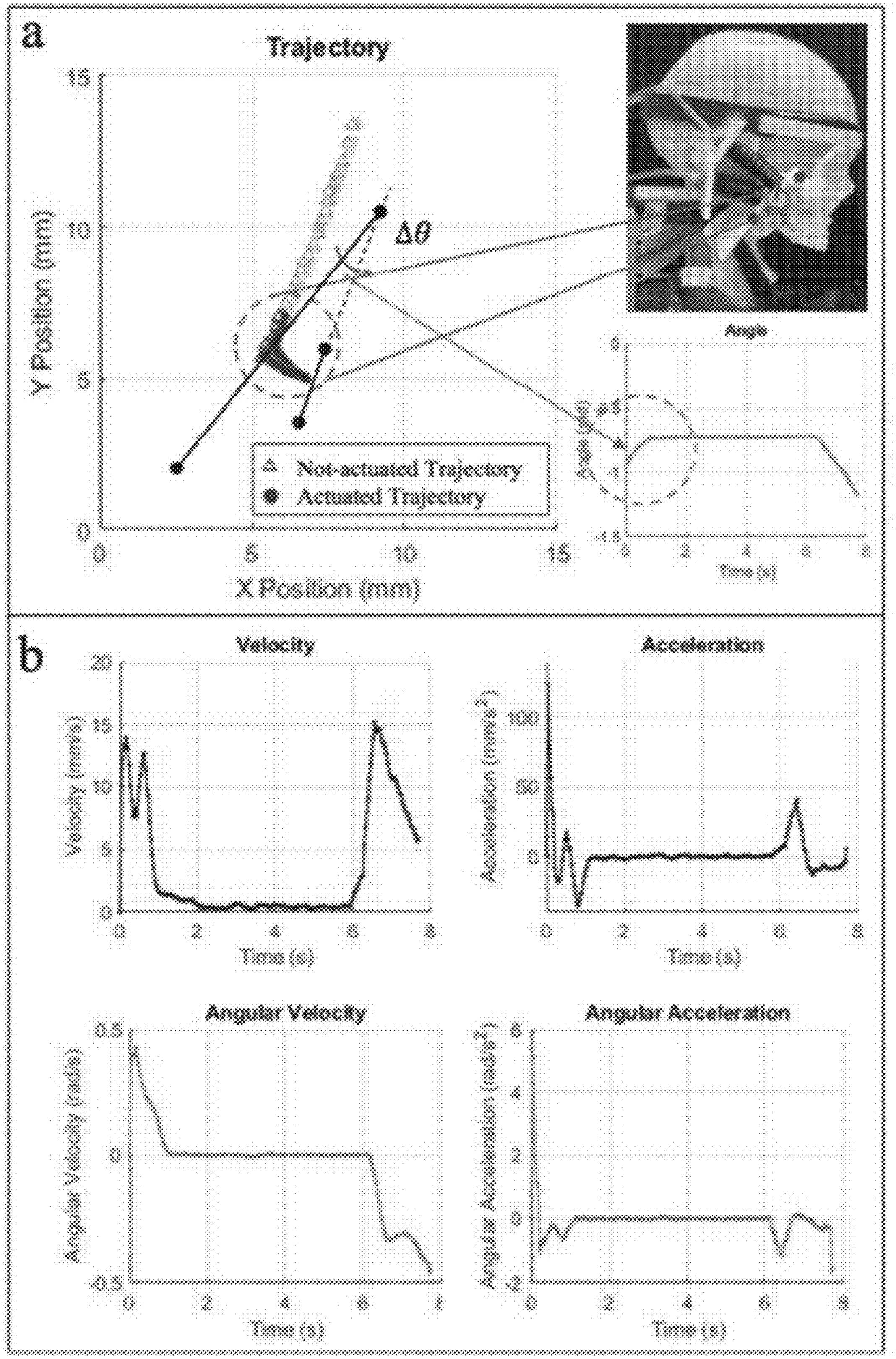
FIG. 12 depicts testing results on skull.

To further investigate the influences of the proposed wearable device on the mouth opening, the on-skull testing was conducted. The head ring was fixed on the skull and the end effector of the device was fixed on the mandible of the model both by soft ribbons. The skull is assumed to be static and fixed on a shelf. The lower jaw was connected to an air cylinder and the major motion of opening is actuated by the cylinder. Both opening trajectories were captured and analyzed of: 1) not actuating the device; 2) actuating the device. The trajectories were compared and shown in FIG. 12. A sliding motion can be obviously observed applying the proposed device for pushing the model condyle out of the glenoid structure, which conforms to the humans' nature, shown by the blue triangles and red dots in the figure. Such sliding exoskeleton support could train the patients to correctly open their mouth without further damage to the TMJ.

The experimental results and observations are of remarkable importance to TMD rehabilitation device development. The proposed exoskeleton soft device design brought three main contributions compared to the current therapy methods: 1) substantially mimicking the real human's jaw motion trajectory, reducing the total weight of the wearable parts considering the patients' comfort and safety; 2) reserving the system other-direction compliance while being actuated in jaw-sliding plane, reducing further damage during training due to individual difference; 3) fitting with TMJ features, enabling a customizable trajectory planning by pneumatic control, paving the way for further TMD treatment. Moreover, it is demonstrated on a skull model that the condyle of the mandible can be effectively pushed out of the glenoid structure with the support of the proposed wearable device.

This disclosure tackled the challenges in exoskeleton wearable device for TMD treatments by offering a soft approach to TMJ motion generation. The two-actuator soft robotic joint are investigated, showing their superior performance in trajectory mimicking with the pneumatic control. An exoskeleton soft wearable device is developed using blow molding and 3D printing techniques to provide a mandible movement guide. Experiments and computer vision capturing are conducted on both proposed soft robotic joint and a skull model, revealing underlying mechanisms and distinctive characteristics of the TMJ motion. Compared with the current training methods, the proposed exoskeleton soft wearable device is hyper light weight, comfortable and safe to the patients, and performs accustomed to the human nature.

The disclosure also offers insights to rehabilitation device design, offering a variable solution to patients training with system compliance with soft approach. Moreover, convenient trajectory planning to accommodate individual difference by pneumatic control enables capability of customization for different patients' physiological structure. Such prodigious customized ability brings usability and safety to the application of rehabilitation device on complicated disease.

Unless otherwise indicated in the examples and elsewhere in the specification and claims, all parts and percentages are by weight, all temperatures are in degrees Centigrade, and pressure is at or near atmospheric pressure.

With respect to any figure or numerical range for a given characteristic, a figure or a parameter from one range may be combined with another figure or a parameter from a different range for the same characteristic to generate a numerical range.

Other than in the operating examples, or where otherwise indicated, all numbers, values and/or expressions referring to quantities of ingredients, reaction conditions, etc., used in the specification and claims are to be understood as modified in all instances by the term "about."

While the invention is explained in relation to certain embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An exoskeleton wearable device configured to push a condyle out from a glenoid structure of a skull, comprising:
- two bellows shaped actuators each having an elliptical cross-section;
- an upper part configured to be fixed on a forehead of a patient and provide a base for the two bellows shaped actuators; and
- a lower part configured to be fixed on a mandible of the patient and substantially static to the mandible but moveable in a horizontal plane and a vertical plane with respect to the upper part.

2. The exoskeleton wearable device according to claim 1, wherein the two bellows shaped actuators are pneumatic actuators.

3. The exoskeleton wearable device according to claim 1, with the proviso that the two bellows shaped actuators do not have a circular cross-section.

4. The exoskeleton wearable device according to claim 1, wherein the upper part has a ring shape and configured to be substantially static during mandibular movement.

5. The exoskeleton wearable device according to claim 1, further comprising a pneumatic control system.

6. The exoskeleton wearable device according to claim 5, wherein the pneumatic control system comprises a pressure sensor, a solenoid valve, and a driver board.

7. The exoskeleton wearable device according to claim 1, having a weight of 340 grams or less.

8. A method of treating a temporomandibular disorder, comprising:
- attaching the exoskeleton wearable device according to claim 1 to the skull of a patient; and
- using the exoskeleton wearable device according to claim 1 to facilitate at least one of opening or closing a jaw of the patient.

9. The method according to claim 8, wherein using the exoskeleton wearable device comprises actuating at least one of the two bellows shaped actuators.

10. The method according to claim 8, wherein using the exoskeleton wearable device comprises actuating both of the two bellows shaped actuators.

11. An exoskeleton wearable device configured to push a condyle out from a glenoid structure of a skull, comprising:
- two bellows shaped actuators each having an elliptical cross-section;
- an upper part configured to be fixed on a forehead of a patient and provide a base for the two bellows shaped actuators;
- a lower part configured to be fixed on a mandible of the patient and substantially static to the mandible but moveable in a horizontal plane and a vertical plane with respect to the upper part; and
- a pneumatic controller configured to generate pressure command output according to a desired motion trajectory to facilitate moving the lower part relative to the upper part.

12. The exoskeleton wearable device according to claim 11, wherein the two bellows shaped actuators are pneumatic actuators.

13. The exoskeleton wearable device according to claim 11, with the proviso that the two bellows shaped actuators do not have a circular cross-section.

14. The exoskeleton wearable device according to claim 11, wherein the upper part has a ring shape and configured to be substantially static during mandibular movement.

15. The exoskeleton wearable device according to claim 11, wherein the pneumatic controller comprises a pressure sensor, a solenoid valve, and a driver board.

16. The exoskeleton wearable device according to claim 11, having a weight of 340 grams or less.

* * * * *